(12) United States Patent  (10) Patent No.: US 9,104,249 B2
Cheng et al.  (45) Date of Patent: Aug. 11, 2015

(54) ELECTRONIC SYSTEM WITH POINTING DEVICE AND METHOD THEREOF

(71) Applicant: PIXART IMAGING INC., Hsin-Chu (TW)

(72) Inventors: Han Ping Cheng, Hsinchu (TW); Chia Cheun Liang, Hsinchu (TW)

(73) Assignee: Pixart Imaging Inc., Hsin-Chu (TW)

( * ) Notice: Subject to any disclaimer, the term of this patent is extended or adjusted under 35 U.S.C. 154(b) by 299 days.

(21) Appl. No.: 13/929,137

(22) Filed: Jun. 27, 2013

(65) Prior Publication Data

US 2014/0062871 A1   Mar. 6, 2014

(30) Foreign Application Priority Data

Sep. 4, 2012   (TW) .............................. 101132121 A

(51) Int. Cl.
   *G06F 3/03* (2006.01)
   *G06F 3/033* (2013.01)
   *G06F 3/038* (2013.01)
   *G06F 3/0346* (2013.01)

(52) U.S. Cl.
   CPC .............. *G06F 3/033* (2013.01); *G06F 3/0304* (2013.01); *G06F 3/038* (2013.01); *G06F 3/0346* (2013.01)

(58) Field of Classification Search
   CPC ...... G06F 3/0304; G06F 3/033; G06F 3/0346
   USPC ......................................................... 345/157
   See application file for complete search history.

(56) References Cited

U.S. PATENT DOCUMENTS

2010/0123659 A1   5/2010   Beeman et al.

FOREIGN PATENT DOCUMENTS

| CN | 101398711 A | 4/2009 |
|---|---|---|
| CN | 101482782 A | 7/2009 |
| EP | 2 042 970 A1 | 4/2009 |

OTHER PUBLICATIONS

Office Action from Republic of China Intellectual Property Office in the corresponding Taiwan application 101132121 dated Jun. 26, 2014, 5 pages, with partial English translation.

*Primary Examiner* — Michael Pervan
(74) *Attorney, Agent, or Firm* — Juan Carlos A. Marquez; Bacon & Thomas PLLC

(57) ABSTRACT

The present invention discloses an electronic system and a pointing device thereof. The pointing device includes an image sensor and a processor. The image sensor sequentially generates a first image frame and a second image frame, wherein the first image frame has two images related to a sensed target, and the second image frame has one image related to the sensed target. The processor determines one image position representing the sensed target using the first image frame, and subsequently determines one image displacement using the first image frame and the second image frame.

30 Claims, 15 Drawing Sheets

ELECTRONIC SYSTEM WITH POINTING DEVICE AND METHOD THEREOF

BACKGROUND OF THE INVENTION

1. Technical Field

The present invention relates to an electronic system with a pointing device and method thereof.

2. Background

The principle of a pointing device apparatus is to utilize an image frame captured by an image sensor, analyzing the position of an image of a reference point within the captured image frame, and locating the cursor according to the position of the image of the reference point in order to achieve the function of pointing.

When other objects such as a mirror or a smooth surface reflect the reference point, two images, including the reference point and the reflection thereof, will be simultaneously captured by the image sensor. Because the image sensor is not able to differentiate the reference point from the reflection of the reference point, a cursor jump normally occurs. In other words, during the motion of the pointing apparatus, when the image of the reference point disappears, another image will be selected for the basis of calculation, and hence the cursor jump occurs, creating a disturbing experience to the user operating the pointing apparatus.

SUMMARY

Due to the deficiencies of the conventional apparatus described above, the present invention provides an innovative electronic system with a pointing device and method thereof.

One embodiment of the present invention provides a pointing device, including an image sensor generating a first image frame and a second image frame in a sequential manner, wherein the first image frame comprises two images related to a sensed target, and the second image frame comprises one image related to the sensed target; and a processor configured to determine an image position representing the sensed target from the first image frame and to determine an image displacement from the first image frame and the second image frame.

One embodiment of the present invention provides an image tracking method, the method comprises: providing an image sensor generating a first image frame and a second image frame, wherein the first image frame comprises two images related to a sensed target, and the second image frame comprises an image related to the sensed target; and providing a processor configured to output a coordinate data of one of the two images of the first image frame, and configured to output a relative displacement between the image of the second image frame and a corresponding image of the first image frame.

One embodiment of the present invention provides an electronic system, including a sensed target, a pointing device apparatus, and an electronic device. The pointing device apparatus has an image sensor and a processor. The image sensor senses the target, and generates a first image frame and a second image frame, wherein the first image frame comprises two images related to the sensed target, and the second image frame comprises one image related to the sensed target. The processor is configured to output coordinate data of one of the two images of the first image frame and output a relative displacement between the image of the second image frame and a corresponding image, wherein the corresponding image is one of the two images of the first image frame. The electronic apparatus further includes a monitor showing a cursor, wherein the electronic apparatus locates the cursor according to the coordinate data.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

The objectives and advantages of the present invention are illustrated with the following description and upon reference to the accompanying drawings in which.

DETAILED DESCRIPTION

Figure 1A:
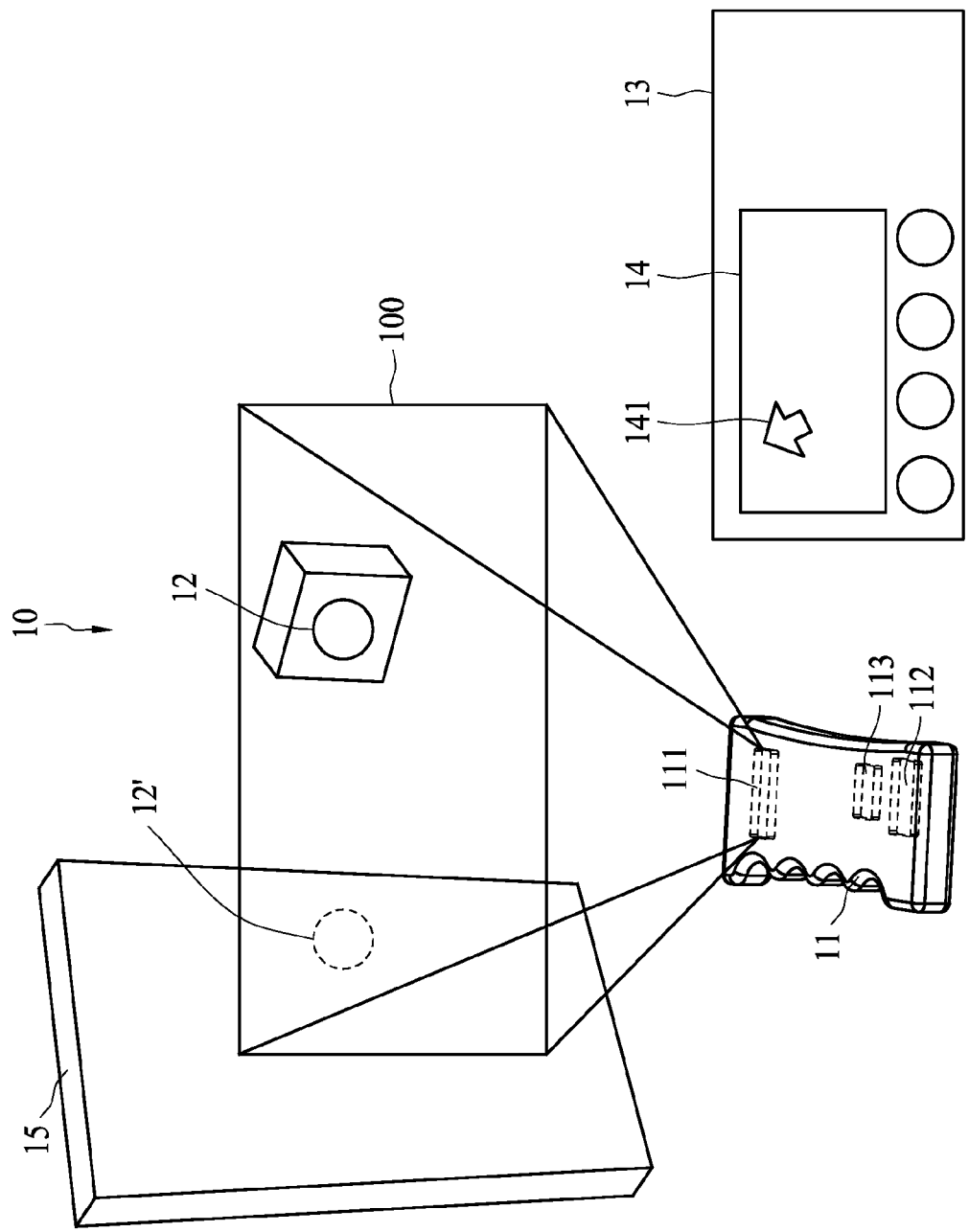
FIG. 1A and FIG. 1B depict an electronic system according to one embodiment of the present invention.
Figure 1B:
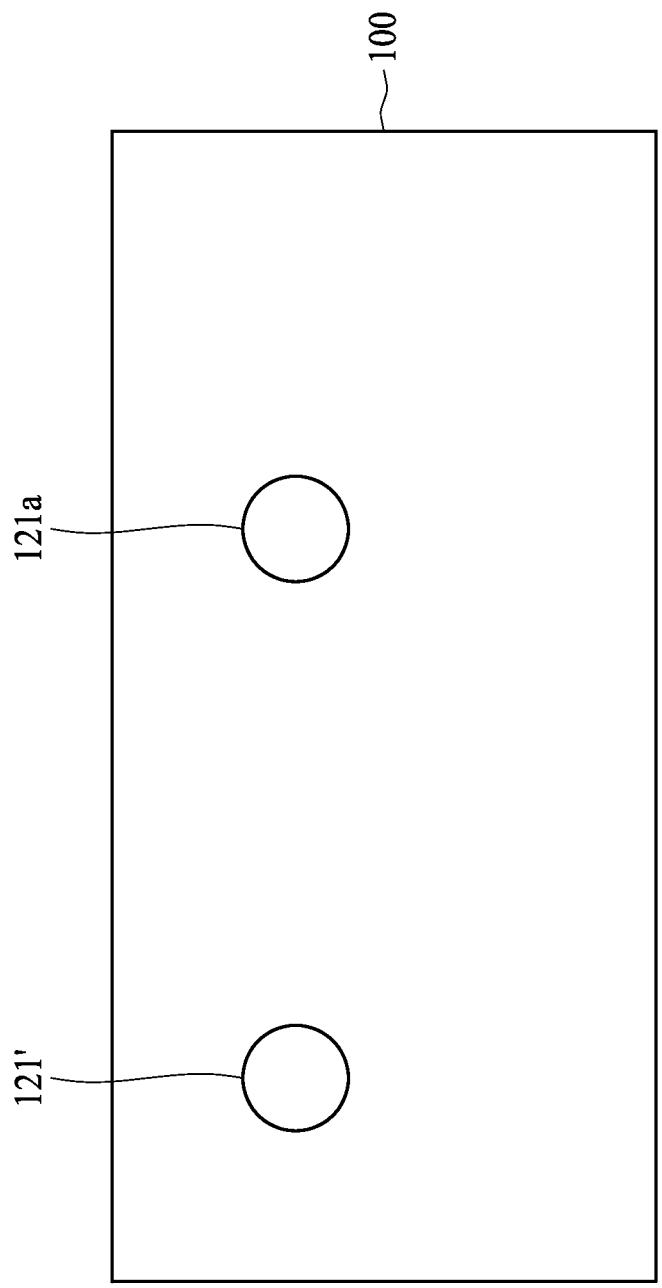

FIG. 1A shows an electronic system 10 according to one embodiment of the present invention. FIG. 1B exemplifies a first image frame 100. The electronic system 10 includes a pointing apparatus 11, a sensed target 12, and an electronic apparatus 13 having a monitor 14, wherein the pointing apparatus 11 further includes an image sensor 111 and a processor 112. The image sensor 111 is configured to capture an image of the sensed target 12, and the processor 112 is configured to analyze the position of said image in order to determine the pointing direction or the spatial orientation of the pointing apparatus 11.

A reflective object 15 is positioned in a proximity to the sensed target 12, wherein the reflective object 15 can generate a reflection 12' of the sensed target 12, and the reflection 12' can also be captured when a user is operating the pointing apparatus 11. In one embodiment, the sensed target 12 includes a light source. In another embodiment, the sensed target 12 includes a light emitting diode. In another embodiment, the sensed target 12 includes a light bar.

In another embodiment, the reflective object 15 may be replaced by a light source which is stationary with respect to the sensed target 12. Therefore the light source can be treated as the reflective object 15 as well.

As shown in FIG. 1A and FIG. 1B, the image sensor 111 captures a first image frame 100 including the image 121a of the sensed target 12 and the image 121' of the reflection 12' generated by the reflective object 15. The processor 112 can select the image 121a or the image 121' to represent the sensed target 12, and obtain the pointing coordinate or the spatial orientation of the pointing apparatus 11 in accordance to the calculation of the position of the image 121a or the image 121' on the first image frame 100. The electronic apparatus 13 controls the motion or the position of a cursor 141 on the screen 14 according to the result of the calculation. In the present embodiment, through the image data transmitted by the image sensor 111, the processor 112 can select one of the following for calculation: the coordinate of the sensed target 12 relative to the pointing apparatus 11 and/or the coordinate of the reflection 12' of the sensed target 12 formed by the reflective object 15. In other words, the coordinate can represent the position of the sensed target 12 and/or the position of the reflection 12' in the first image frame 100.

The pointing apparatus 11 can further includes a wireless unit 113, and through the wireless unit 113, the pointing apparatus 11 is allowed to communicate with the electronic apparatus 13. After an image representing the sensed target 12 is determined by the processor 112 according to the first image frame 100, said image is utilized to obtain the necessary information controlling the cursor 141 on the monitor 14. The pointing device 11 transmits said information to the electronic apparatus 13 through the wireless unit 113, and the electronic apparatus 13 moves the cursor 141 by using said information. During operations of the pointing apparatus 11, a plurality of image frames will be generated, and the data provided by the plurality of image frames allows the electronic apparatus 13 to continuously move the cursor 141, and hence the displacement of the cursor can be controlled. In one embodiment, the information required to control the cursor 141 of the monitor 14 includes coordinates or translation vectors.

Figure 1C:
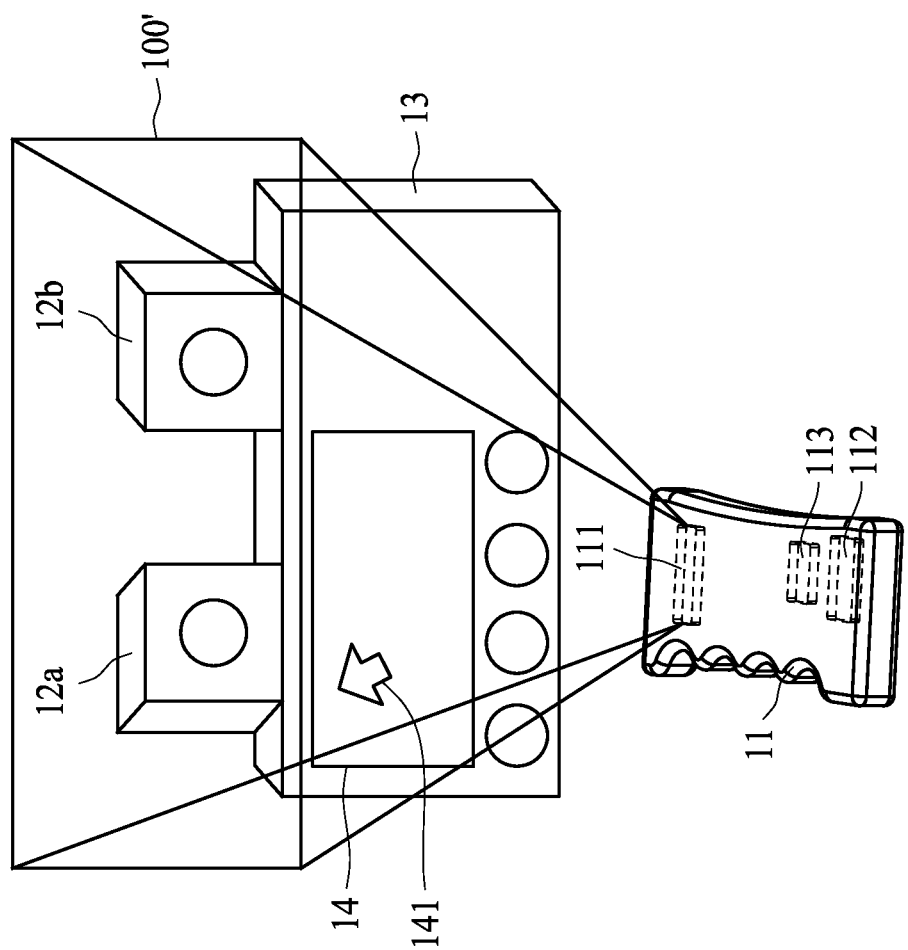
FIG. 1C illustrates a perspective view according to one embodiment of the present invention.

FIG. 1C shows an electronic system according to one embodiment of the present invention. The electronic system includes a pointing apparatus 11, two sensed targets 12a, 12b, and an electronic apparatus 13 having a monitor 14, wherein the pointing apparatus 11 further includes an image sensor 111, a processor 112, and a wireless unit 113. The image sensor 111 can capture the images of the sensed target 12a, 12b, and the processor 112 analyzes the positions of those images in order to determine the pointed position or the spatial orientation of the pointing apparatus 11. Two sensed targets 12a, 12b are used to determine the orientation of the image sensor 111 in accordance with the relative position between the two sensed targets 12a, 12b. For example, if the image frame 100' captured by the image sensor 111 shows that the sensed target 12a is to the left of the sensed target 12b, the processor 112 can determine that the upper surface of the pointing apparatus 11 (the upper surface in the present embodiment refers to the surface including the image sensor 111, the processor 112, and the wireless unit 113) faces upward. In contrast, if the image frame 100' captured by the image sensor 111 shows that the sensed target 12a is to the right of the sensed target 12b, the processor 112 can determine that the upper surface of the pointing apparatus 11 faces downward. Due to the existence of two sensed targets 12a, 12b, the image frame 100' captured by the image sensor 111 can have two or more images including the sensed target itself and the reflection thereof.

Figure 2A:
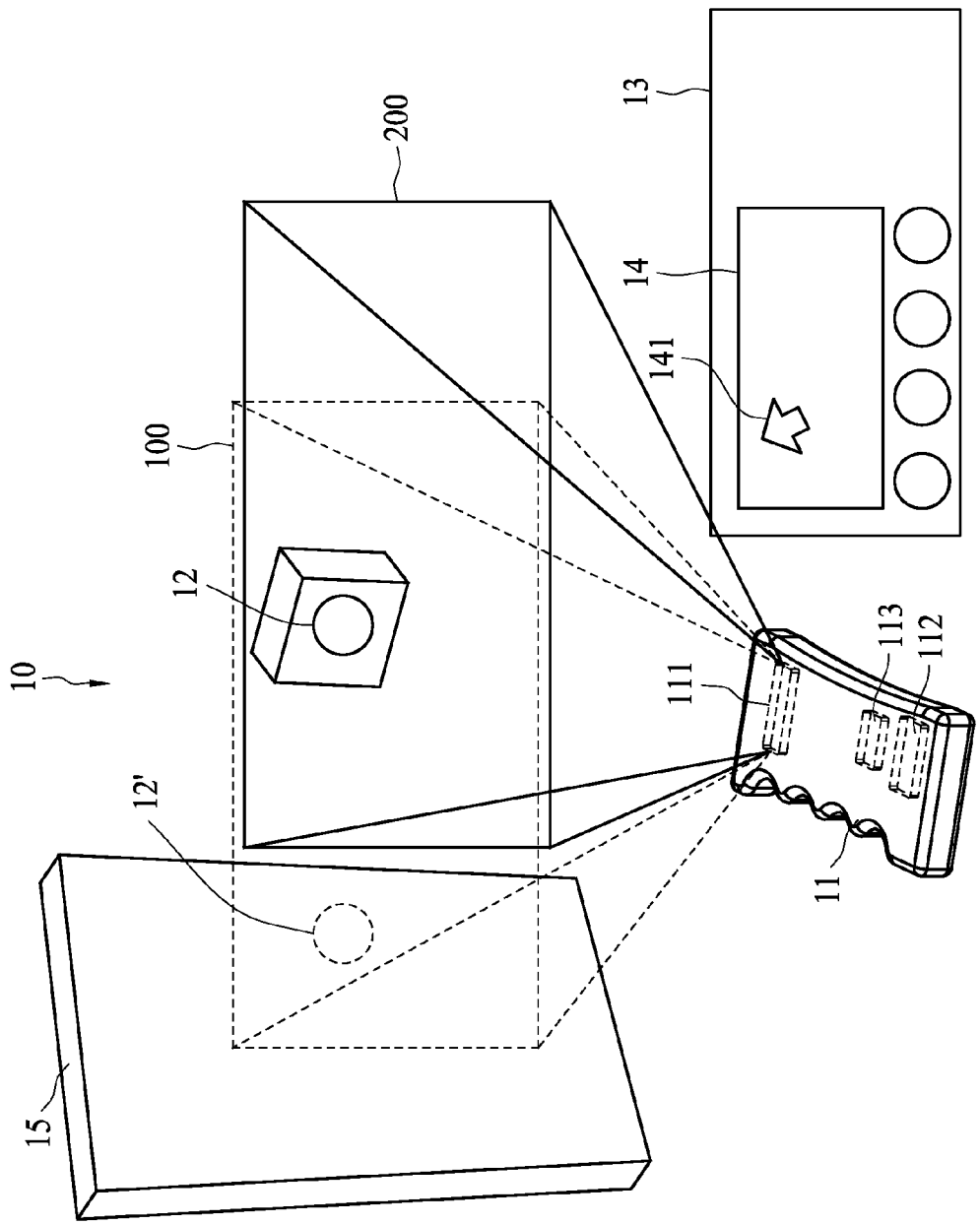
FIG. 2A and FIG. 2B depict an electronic system according to one embodiment of the present invention.
Figure 2B:
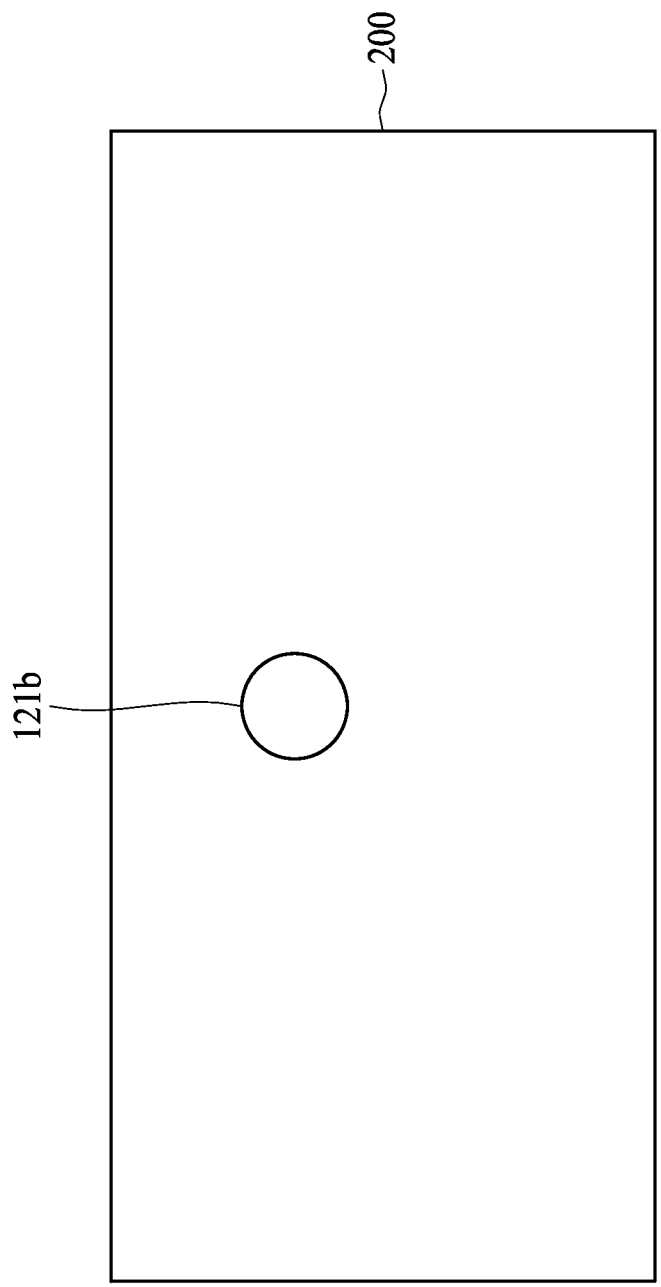

As shown in FIG. 2A and FIG. 2B, after the user moves the pointing apparatus 11, the image sensor 111 then captures a second image frame 200. Because the reflection 12' is outside of the sensing range of the image sensor 111 at the time capturing the second image frame 200, the second image frame 200 left with the image of the sensed target 12, and the image of the reflection 12' of the sensed target originally appeared in the first image frame 100 disappears in the second image frame 200. If the processor 112 originally selects the image 121' (see FIG. 1B) of the reflection 12' in the first image frame 100 to represent the sensed target 12, and the processor 112 outputs the coordinate of the image 121b of the sensed target 12 in the second image frame 200, the cursor jump occurs. Different from the above-mentioned processing method, the present embodiment prevents the occurrence of the cursor jump by outputting a relative displacement between the coordinate of the image 121a (see FIG. 1B) of the sensed target 12 in the first image frame 100 and the coordinate of the image 121b of the sensed target 12 in the second image frame 200, summing said relative displacement and the coordinate of the image 121' of the reflection 12' calculated by the first image frame, and outputting the result to the electronic apparatus 13 in order to control the position of the cursor 141 on the monitor. In the present embodiment, the image 121a of the sensed target 12 in the first image frame 100 is a corresponding image of the image 121b of the sensed target 12 in the second image frame 200. Methods for determining which image in the first image frame 100 is the corresponding image of the image in the second image frame 200 will be described in the following paragraphs.

Similarly, although the system shown in FIG. 1C has a plurality of sensed targets, using the determining method described in FIG. 1A, FIG. 1B, FIG. 2A, and FIG. 2B can prevent the cursor jump problem occurring in the system shown in FIG. 1C.

Figure 3A:
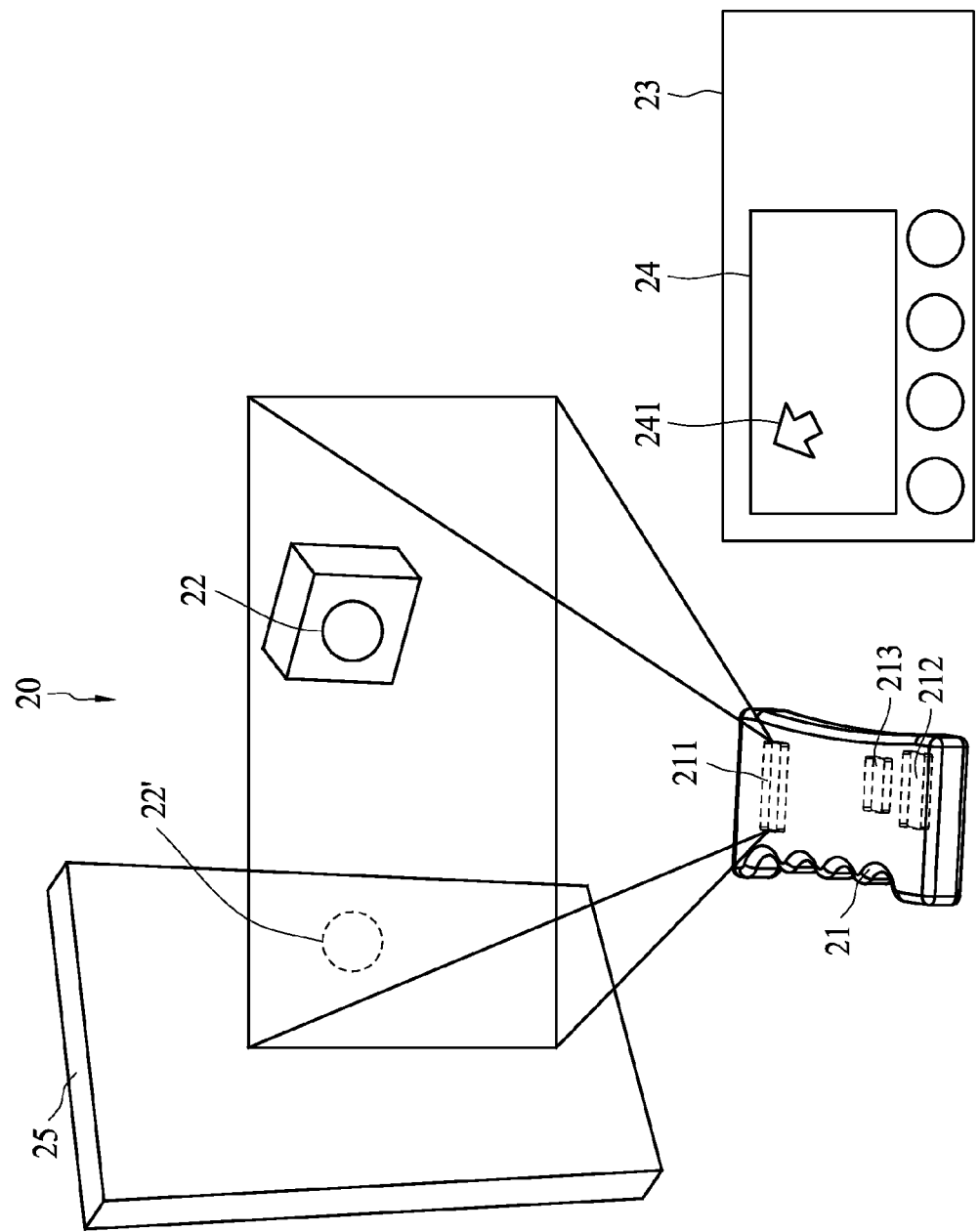
FIG. 3A depicts an electronic system according to one embodiment of the present invention.
Figure 3B:
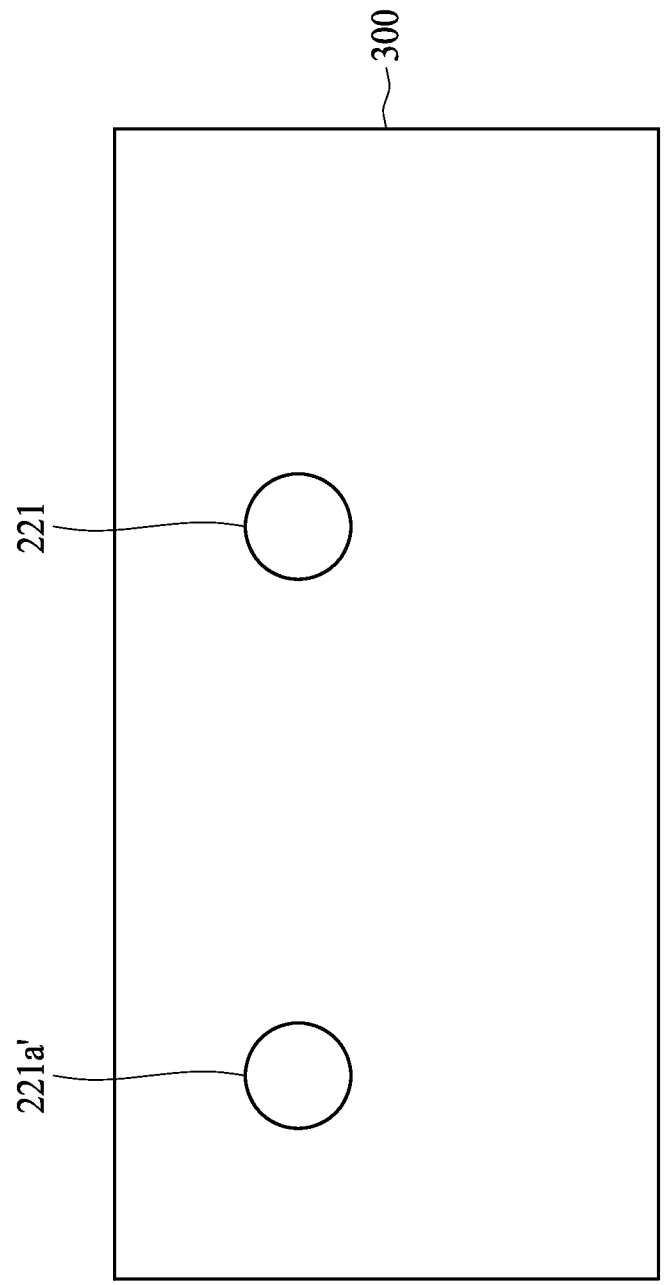
FIG. 3B illustrates a perspective view according to one embodiment of the present invention.

FIG. 3A shows an electronic system 20 according to one embodiment of the present invention. FIG. 3B shows a first image frame 300. The electronic system 20 includes a pointing apparatus 21, a sensed target 22, and an electronic apparatus 23 having a monitor 24. The pointing apparatus 21 further includes an image sensor 211 and a processor 212. A reflective object 25 is positioned in a proximity to the sensed target 22, wherein the reflective object 25 can generate a reflection 22' of the sensed target 22, and the reflection 22' can also be captured when a user is operating the pointing apparatus 21.

The image sensor 211 captures a first image frame 300 including the image 221 of the sensed target 22 and the image 221a' of the reflection 22' generated by the reflective object 25. The processor 212 can select the image 221 or the image 221a' to represent the sensed target 22, and obtain the pointed position or the spatial orientation of the pointing apparatus 21 in accordance to the calculation of the position of the image 221 or the image 221a' in the first image frame 200. The electronic apparatus 23 controls the motion or the position of a cursor 241 on the screen 24 according to the result of the calculation. In the present embodiment, through the image data transmitted by the image sensor 211, the processor 212 simultaneously traces the coordinate of the sensed target 22 and the coordinate of the image of the reflection 22' on the reflective object 25.

The pointing apparatus 21 can further include a wireless unit 213, and through the wireless unit 213, the pointing apparatus 21 is allowed to communicate with the electronic apparatus 23. The communication processes are identical to those described in the previous paragraphs.

Figure 4A:
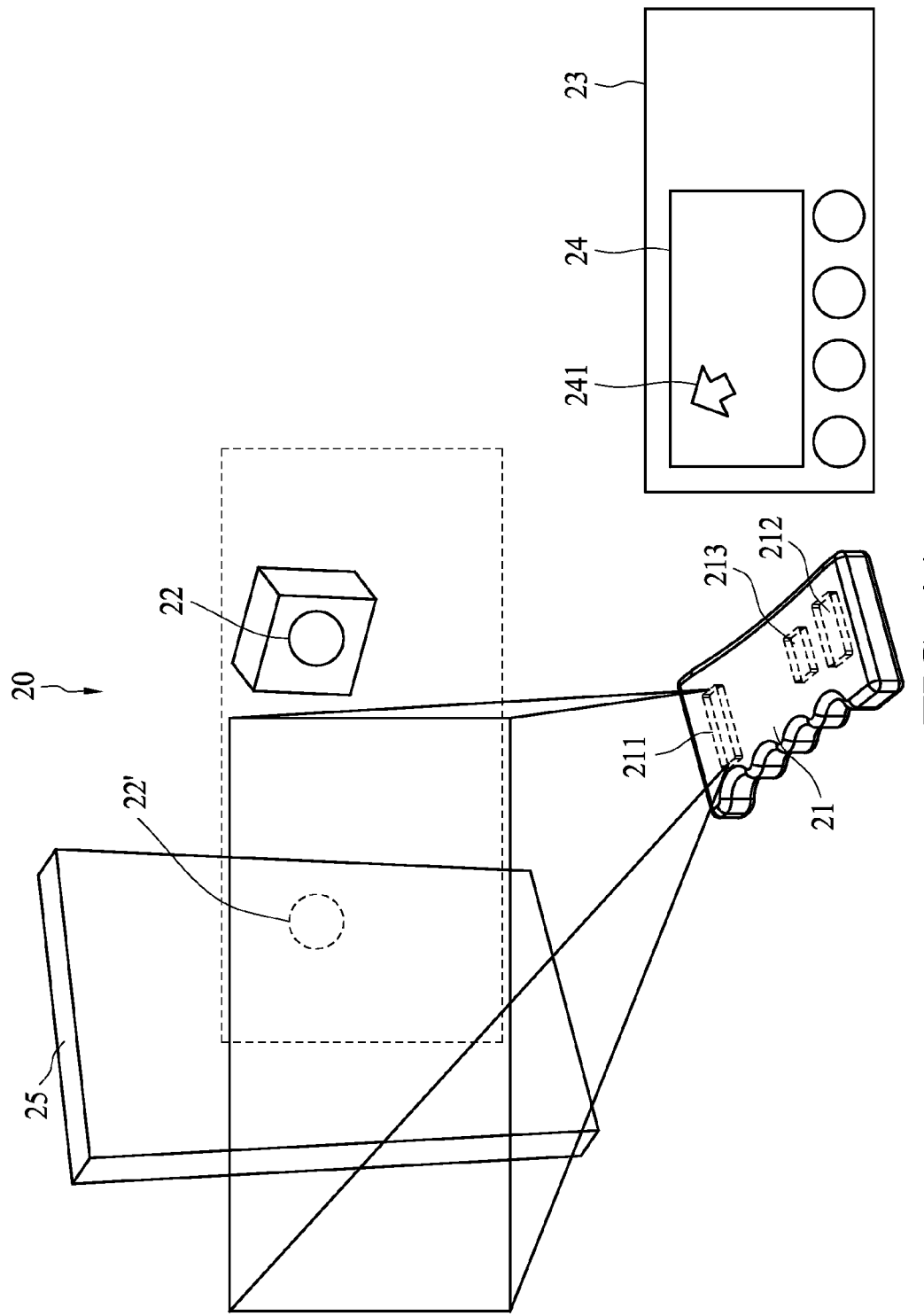
FIG. 4A depicts an electronic system according to one embodiment of the present invention.
Figure 4B:
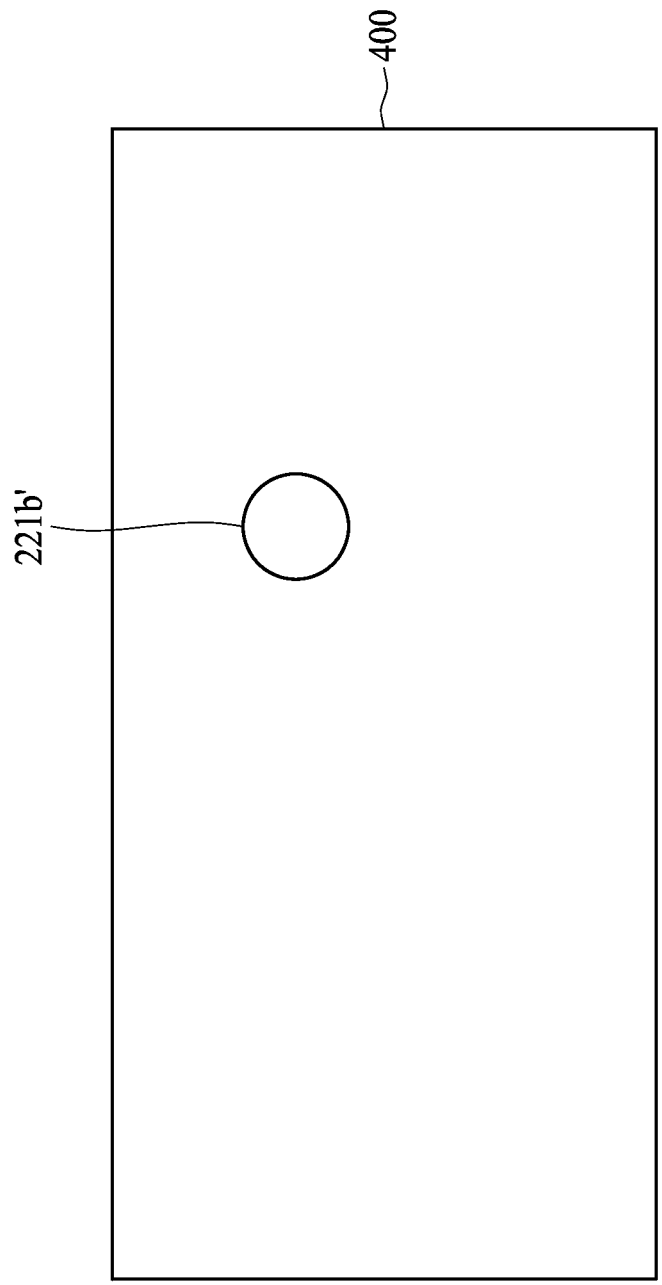
FIG. 4B illustrates a perspective view according to one embodiment of the present invention.

As shown in FIG. 4A and FIG. 4B, after the user moves the pointing apparatus 21, the image sensor 211 then captures a second image frame 400. Because the image 221 of the sensed target 22 is outside of the sensing range of the image sensor 211 at the time capturing the second image frame 400, the second image frame 400 left with the image 221b' of the reflection 22' of the sensed target, and the image 221 of the sensed target originally appeared in the first image frame 300 disappears in the second image frame 400. If the processor 212 directly outputs the coordinate of the image 221b' of the reflection 22' of the sensed target in the second image frame 400, the cursor jump occurs. Different from the above-mentioned processing method, the present embodiment prevent the occurrence of the cursor jump by outputting a relative displacement between the coordinate of the image 221b' of the reflection 22' of the sensed target 22 in the second image frame 400 and the coordinate of the image 221a' of the reflection 22' of the sensed target 22 in the first image frame 300, combining said relative displacement and the coordinate of the image 221 of the sensed target 22 determined by the first image frame 300, and outputting the result to the electronic apparatus 23 in order to control the position of the cursor 241 on the monitor 24.

Similarly, although the system shown in FIG. 1C has a plurality of sensed targets, using the determining method described in FIG. 3A, FIG. 3B, FIG. 4A, and FIG. 4B can prevent the cursor jump problem occurring in the system shown in FIG. 1C.

According to the description from FIG. 3A to FIG. 4B, the image sensor 211 on the pointing apparatus 21 can continuously capture the image of the reflection 22' of the sensed target 22 and transmit the information of the image to the processor 212 for calculation. Through outputting the relative displacement between the image 221b' of the reflection 22' of the sensed target 22 in the second image frame 400 and the image 221a' of the reflection 22' of the sensed target 22 in the first image frame 300, the processor 212 then adds the coordinate of the image 221 of the sensed target 22 calculated according to the first image frame 300 and the relative displacement. Therefore, the cursor jump would not occur during the transition from the first image frame 300 to the second image frame 400. At the same time, when controlling the cursor 241 on the monitor 24 of the electronic apparatus 23 by using the pointing apparatus 21, the user can point the image sensor 211 toward the reflection 22' of the sensed target 22 in the reflective object 25. As long as the image captured has the reflection 22' of the sensed target 22, the processor 212 can control the motion of the cursor 241 without the occurrence of the cursor jump.

The above-mentioned embodiments can increase the effective pointing range and a greater freedom of operation can be obtained by the user operating said pointing apparatus. For example, referring back to FIG. 1A to FIG. 4B, the pointing apparatus 11 can operate under two ranges: in range A (see FIG. 1 and FIG. 2), either the sensed target 12 can be sensed, or both the sensed target 12 and the reflection 12' thereof can be simultaneously sensed (see FIG. 1 and FIG. 2); in range B (see FIG. 3 and FIG. 4), either the reflection 22' can be sensed, or both the sensed target 22 and the reflection 22' thereof can be simultaneously sensed. Under the condition when the image 221 of the sensed target 22 is used to represent the sensed target 22, and the operation is conducted in range B, the relative displacement between the image 221a', 221b' of the reflection 22' can be used to update the coordinate of the image 221 previously determined. By doing this, one can stably control the motion of the cursor 241 on the monitor 24 and prevent the cursor jump from happening. On the other hand, under the condition when the image 121' of the reflection 12' is used to represent the sensed target 12, and the operation is conducted in range A, the relative displacement between the images 121a, 121b can be used to update the coordinate of the image 121' previously determined. By doing this, one can stably control the motion of the cursor 141 on the monitor 14 and prevent the cursor jump from happening. Hence, the pointing apparatus can utilize the sensed target and the reflection thereof, and operates within a greater range, namely range A and range B combined.

As shown from FIG. 1A to FIG. 4B, when the image sensor 111 capturing the first image frames 100, 300 at a first time has a plurality of images 121', 121a, 221, 221a' (sensed target and the reflection thereof in the present embodiment, hereinafter first object image and second object image), the processor can determine whether to output the position of the first object image or the position of the second object image to become the pointing coordinate by analyzing the appearances (for example, the shape or size) and/or the light intensities of the first object image and the second object image. When the image sensor 111 capturing the second image frames 200, 400 each having only a single image 121b or 221b' (sensed target or the reflection thereof in the present embodiment, hereinafter "third object image") at a second time, in addition to referencing the characters such as appearance (for example, the shape or size) and/or light intensity of the images captured, in order to use the third object image to output a pointing coordinate, the processor 112 further determines whether to output the relative displacement between the third object image and the first object image or between the third object image and the second object image as the pointing displacement. The determination process performed by the processor 112 regarding whether to output the pointing displacement or the pointing coordinate is detailed in the following paragraphs.

The electronic system illustrated from FIG. 1A to FIG. 4B is only a part of the embodiments of the present invention. However, in another embodiment of the present invention, the sensed target can be integrated with the monitor. In another embodiment, the processor and the wireless unit can be a single apparatus independent from the pointing apparatus. In another embodiment, the processor is independent from the pointing device and communicates with the pointing device via a transmission wire. In another embodiment, the sensed target may not be placed in the same direction as the monitor, that is, the user can arbitrarily adjust the position of the sensed target and point the pointing apparatus toward that direction regardless of the position of the monitor.

Figure 5:
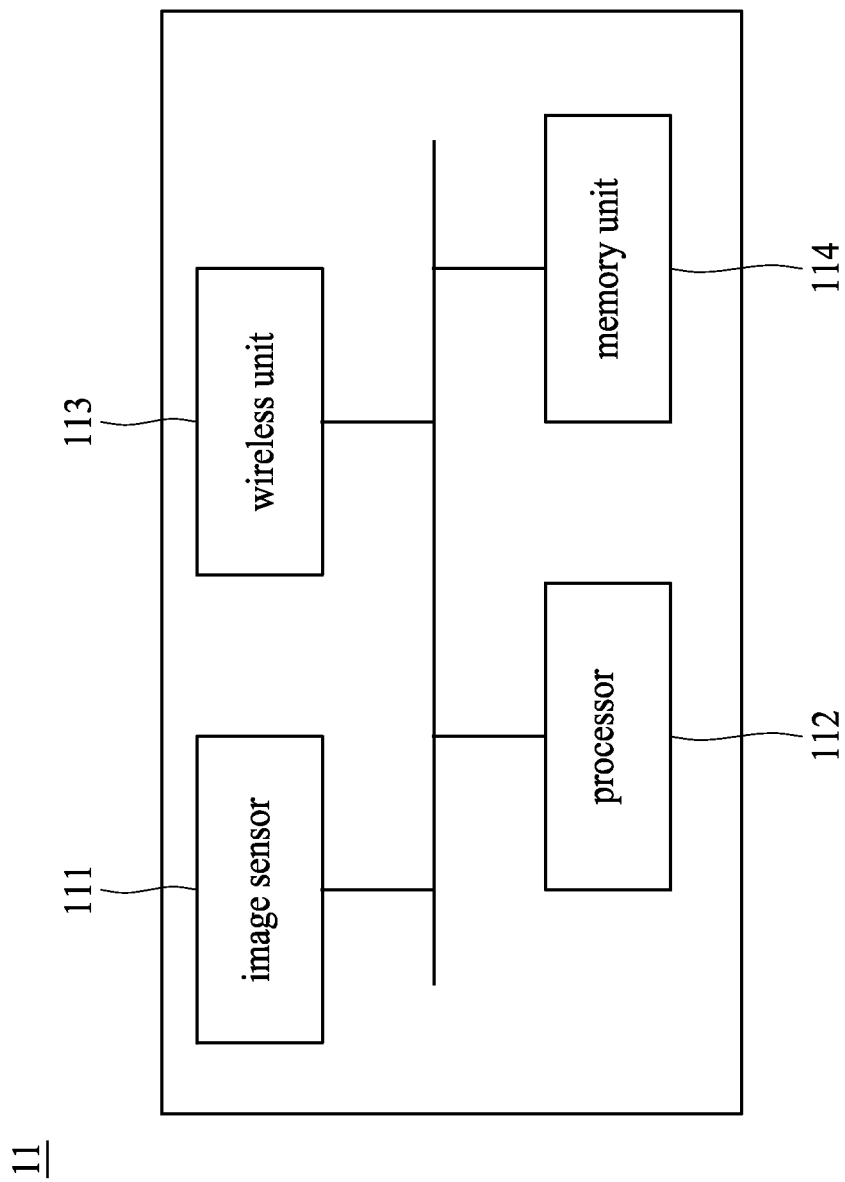
FIG. 5 shows a pointing apparatus according to one embodiment of the present invention.

FIG. 5 shows a pointing apparatus 11 according to one embodiment of the present invention. The pointing apparatus 11 includes an image sensor 111 and a processor 112. The image sensor 111 can be a CMOS image sensor or a CCD image sensor. The image sensor 111 captures a first image frame and a second image frame, and transmits the image frames or the information of the image frames to the processor 112. The first image frame includes two images related to a sensed target, and the second image includes one image related to the sensed target. As shown in FIG. 1A and FIG. 1B, in one embodiment of the present invention, the processor 112 outputs the coordinate of one of the two images in the first image frame as a first position parameter, and saves the coordinate information of the two images in the first image frame in a memory unit 114. When the first image frame replaces the second image frame, the processor 112 outputs a relative displacement, namely a vector representing the change of the position between the single image in the second image frame and a corresponding image in the first image frame. Subsequently, the processor 112 sums the vector and the first position parameter and outputs a second position parameter, and transmits the second position parameter through a wireless unit 133 to a monitor in order to control the position of the cursor thereon. However, the present invention is not limited to transmitting the second position parameter by means of wireless communication. In another embodiment, a transmission wire connecting the processor and the monitor is used.

Figure 6:
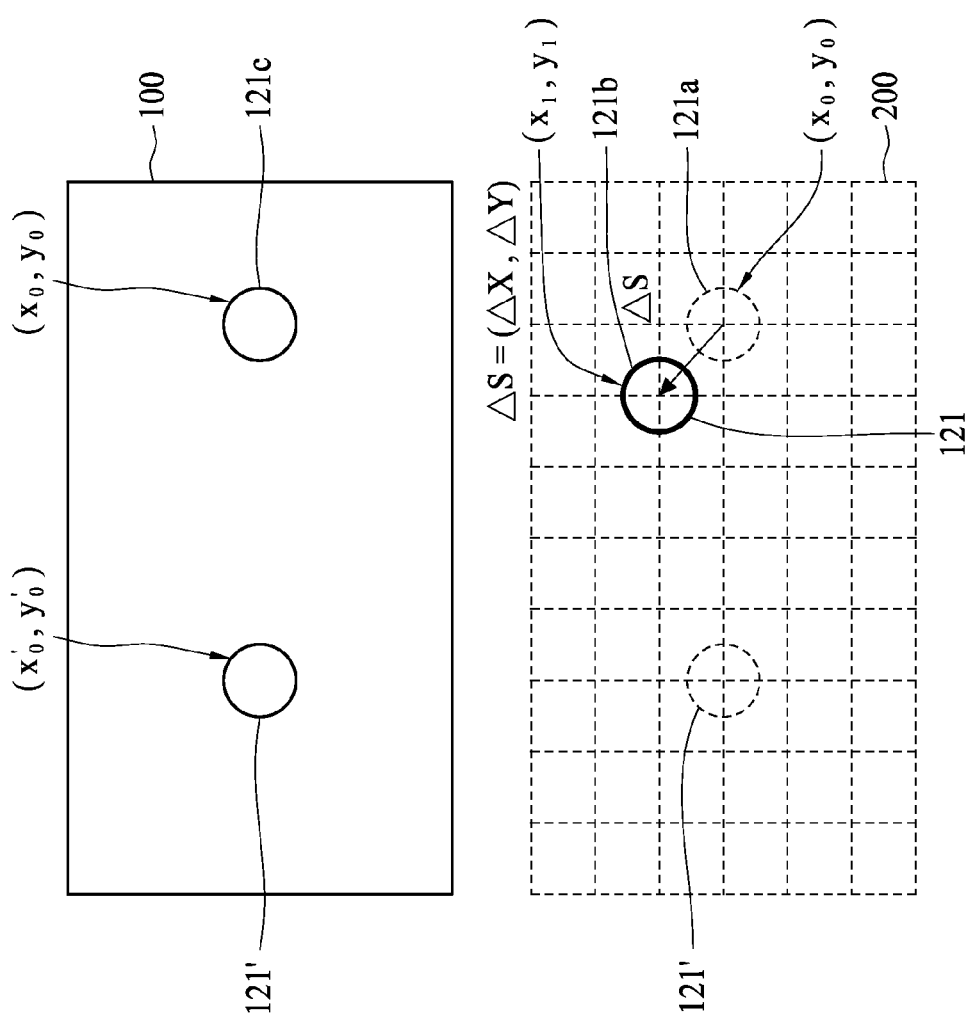
FIG. 6 exemplifies a superposition of images of a sensed target in two images on a grid.

As shown in FIG. 1A, FIG. 1B, and FIG. 6, the image sensor 111 in one embodiment of the present invention transmits the captured image together with the image frame or the information of the captured image to the processor 112. The image 121a of the sensed target in the first image frame 100, the image 121' of the reflection 12' of the first image frame, and the image 121b of the sensed target in the second image frame 200 are together presented on a 10 by 6 grid; however, the present invention is not limited to conduct calculations on said grid. As shown in FIG. 6, in the first image frame 100, the coordinate of the image 121a (presented by a dotted circle) of a sensed target 12 is determined to be $(x_0, y_0)$, and the coordinate of the image 121' (presented by a dotted circle) of the reflection 12' of the sensed target 12 is determined to be $(x_0', y_0')$. At this moment, the processor 112 of the present embodiment tracks the positions of the two images (i.e. the image 121a of the sensed target 12 and the image 121' of the reflection 12' of the sensed target 12) respectively, and saves the changes of the two sets of coordinate data in the memory unit of the processor 112. The processor 112 only selects one set of the coordinate data (in the present embodiment, the image 121' of the reflection 12' of the sensed target 12 is selected) as a first position parameter, and outputs the first position parameter to the electronic apparatus 13, which locates the position of the cursor 141 on the monitor 14 according to the coordinate of the first position parameter. When the image sensor 111 captures a second image frame 200, as shown in FIG. 6, the processor 112 determines one of the followings to be the corresponding image of the image 121' of the reflection 12' of the sensed target 12 in the second image frame 200: the image 121a of the sensed target 12 in the first image frame 100 and the image 121' of the reflection 12' of the sensed target 12 of the first image frame. In the present embodiment, if the image 121a having a coordinate $(x_0, y_0)$ is determined to be the corresponding image of the image 121b (solid circle and with a coordinate of $(x_1, y_1)$) of the sensed target in the second image frame 200, the processor 112 then calculates the relative displacement $\Delta S$ between the corresponding image and the image of the sensed target in the second image frame 200, as shown in FIG. 6. The processor would then sum the relative displacement $\Delta S$ and the coordinate of the first position parameter $(x_0', y_0')$ to obtain a second position parameter $(x_1', y_1')$, and outputs the second position parameter to the electronic apparatus 13.

Figure 7:
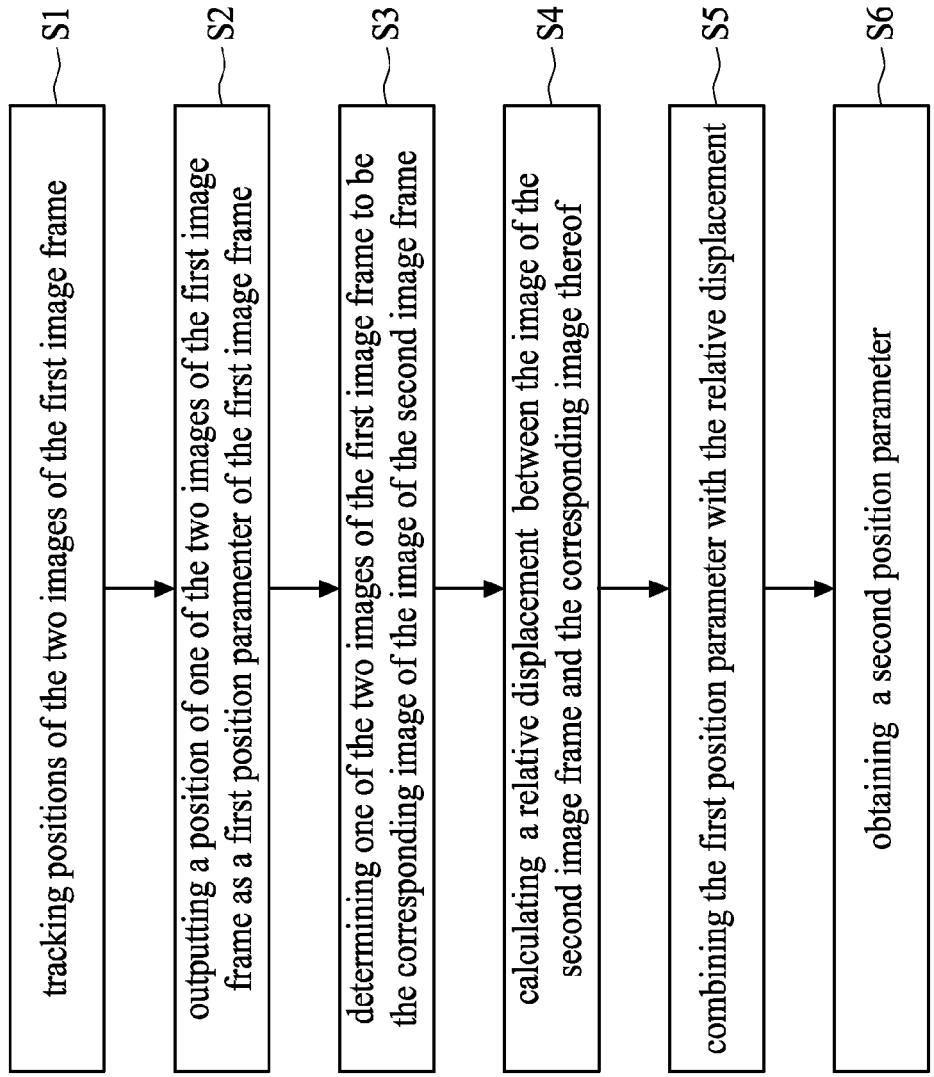
FIG. 7 shows the process flow of an image tracking method according to one embodiment of the present invention.
Figure 8:
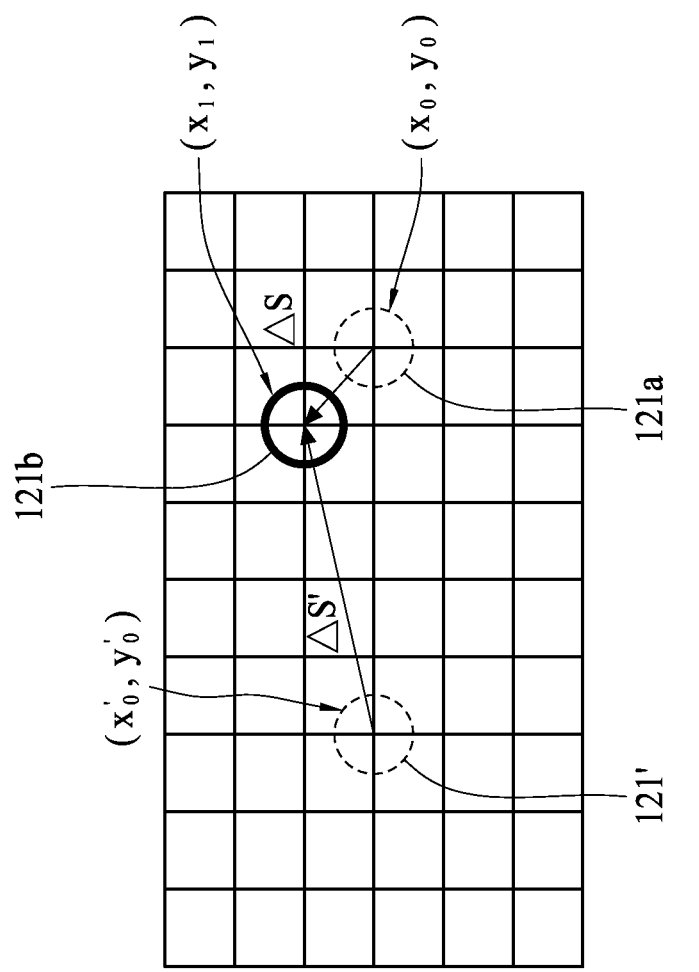
FIG. 8 shows a method of determining a corresponding image according to one embodiment of the present invention.

FIG. 7 shows the image tracking and outputting steps executed by the processor in one embodiment of the present invention. The steps include: tracking the positions of the two images in the first image frame (S1); outputting the coordinate of one of the two images in the first image frame as a first position parameter (S2); determining one of the two images in the first image frame to be the corresponding image in the second image frame (S3); calculating the relative displacement between the image in the second image frame and the corresponding image in the first image frame (S4); combining the first position parameter of the first image frame and the relative displacement (S5); and obtaining a second position parameter (S6). The determining step (S3) includes using the following methods to compare the images in the first image frame and the second image frame. As shown in FIG. 8, the first comparing method compares the relative displacement between the coordinate $(x_0, y_0)$ of the image 121a of the sensed target in the first image frame and the coordinate $(x_1, y_1)$ of the sensed target in the second image frame, and the relative displacement between the coordinate $(x_0', y_0')$ of the image 121' of reflection 12' of the sensed target in the first image frame and the coordinate $(x_1, y_1)$ of the image 121b of the sensed target in the second image frame. When a proper time delay exists between the capturing of the first image frame and the second image frame, the relative displacement between $(x_0, y_0)$ and $(x_1, y_1)$ is $\Delta S$, and the relative displacement between $(x_0', y_0')$ and $(x_1, y_1)$ is $\Delta S'$. The smaller $\Delta S$ is used as a determining factor to adopt the image 121a of the sensed target in the first image frame as the corresponding image of the image 121b of the sensed target in the second image frame. The determination of the corresponding image utilizes a concept of deciding the same object in a former image frame and a latter image frame.

Figure 9A:
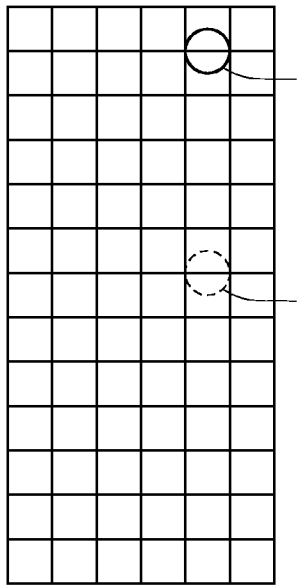
FIG. 9A to FIG. 9F show a method of determining a corresponding image according to one embodiment of the present invention.
Figure 9C:
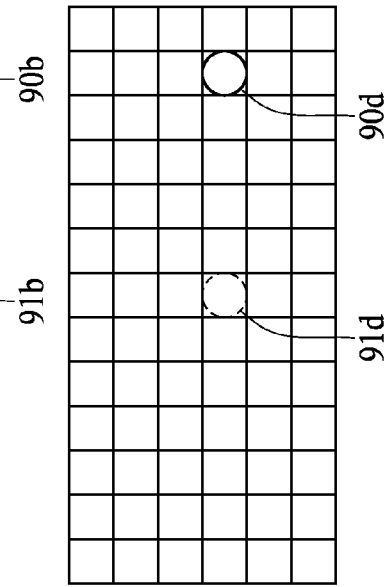
Figure 9E:
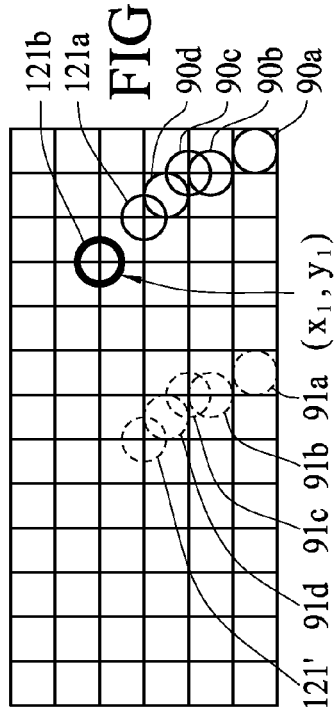
Figure 9B:
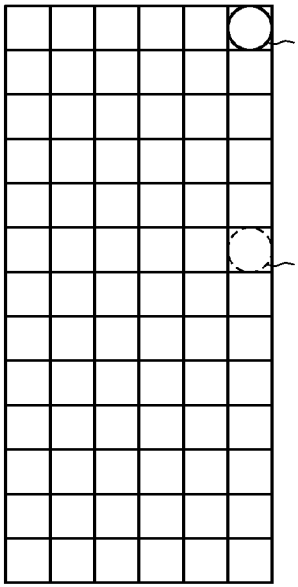
Figure 9D:
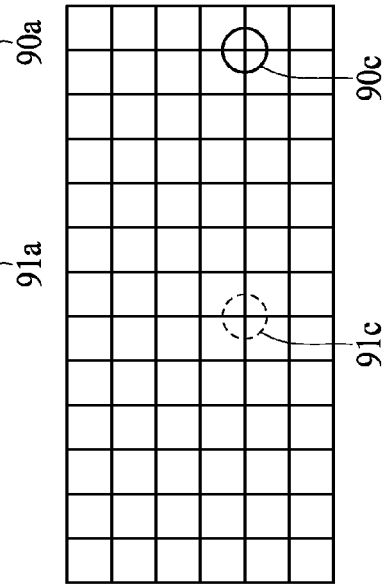
Figure 9F:
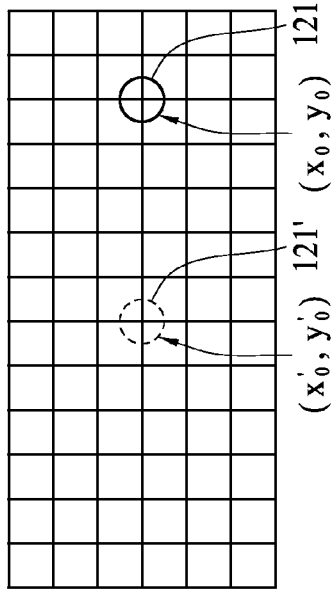

As shown in FIG. 9A to FIG. 9F, the second comparing method tracks the trajectory of the two images of the sensed target in the first image frame 9E and a plurality of image frames (FIG. 9A to FIG. 9D) prior to the first image frame 9E, respectively, and compares the image position in the second image frame 9F to said trajectory. FIG. 9F superimposes the trajectory (including the first image frame itself, 9A to 9E) on the second image frame 9F in order to manifest the relationship between the image in the second image frame 9F and the image frames prior to the first image frame 9E (including the first image frame itself, 9A to 9E); however, the presented method does not limit the present invention. A trajectory can be determined by the images (90a to 90d) in a plurality of image frames (9A to 9D), and another trajectory can be determined by other images (91a to 91d) in a plurality of image frames (9A to 9D). Comparing the two trajectories with the images 121', 121a of the first image frame 9E and the image 121b of the second image frame 9F, one can tell that the image 121b is positioned on the projected extension of the trajectory composed of the images 90a to 90d and the image 121a. Based on the above comparing method, the image 121a of the sensed target in the first image frame can be determined as the corresponding image of the image 121b of the sensed target in the second image frame.

Figure 10:
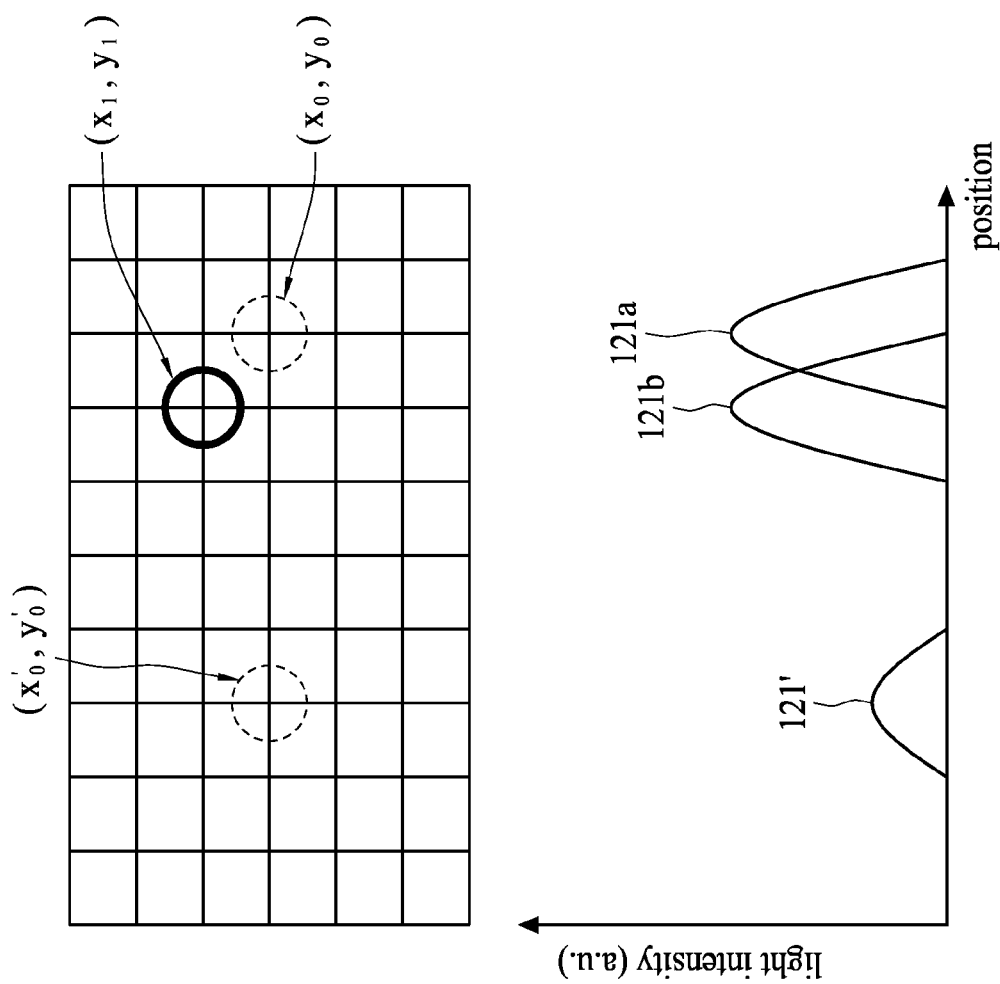
FIG. 10 shows a method of determining a corresponding image according to one embodiment of the present invention.

As shown in FIG. 1B, FIG. 2B, and FIG. 10, the third comparing method compares the light intensity of the image 121b of the sensed target in the second image frame and that of the two images 121' and 121a of the sensed targets in the first image frame. The bottom of FIG. 10 shows a diagram describing the relationship between light intensity and distance. The light intensity of the image 121' of the sensed target is obviously lower than the light intensity of the images (121b, 121a) of the sensed targets. Therefore, the processor can determine that the image 121a of the sensed target in the first image frame and the image 121b of the sensed target in the second image frame are from the same sensed target, and hence the former is the corresponding image of the latter.

In one embodiment of the present invention, all the images of the sensed target captured by the processor have an identical shape such as a circular shape or a rectangular shape. In another embodiment, the images of the sensed target captured by the processor have different shapes. For example, one of the images can have a circular shape; another image can have an elliptical shape. The processor then utilizes the identical flickering frequency to identify sensed targets. In another embodiment, the sensed target includes a plurality of light spots.

In one embodiment of the present invention, the image sensor is positioned on a hand-held pointing apparatus. In another embodiment, the image sensor, the processor, and the wireless unit are all integrated on a hand-held pointing apparatus.

Although the present invention and its advantages have been described in detail, it should be understood that various changes, substitutions and alterations can be made herein without departing from the spirit and scope of the invention as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A pointing device apparatus, comprising:
   an image sensor generating a first image frame and a second image frame in a sequential manner, wherein the first image frame comprises two images related to a sensed target, and the second image frame comprises one image related to the sensed target; and
   a processor configured to determine an image position representing the sensed target using the first image frame and to determine an image displacement using the first image frame and the second image frame.

2. The pointing device apparatus of claim 1, wherein the processor is configured to determine a coordinate data of one of the two images of the first image frame.

3. The pointing device apparatus of claim 1, wherein the processor is configured to determine a relative displacement between the image of the second image frame and a corresponding image of the first image frame.

4. The pointing device apparatus of claim 3, wherein the corresponding image of the first image frame is the image that is closer to the image of the second image frame.

5. The pointing device apparatus of claim 3, wherein the corresponding image of the first image frame is the image that is on the same trajectory as the image of the second image frame.

6. The pointing device apparatus of claim 3, wherein the corresponding image of the first image frame is the image that a light intensity is closer to the image of the second image frame.

7. The pointing device apparatus of claim 1, wherein the two images of the first image frame comprise a reflection image of the sensed target.

8. The pointing device apparatus of claim 1, wherein the processor further combine the image position with the image displacement.

9. The pointing device apparatus of claim 1, wherein the images of the first image frame and the second image frame comprise identical shape or identical flickering frequency.

10. A pointing device apparatus, comprising:
    an image sensor, capturing a first image frame at a first time and a second image frame at a second time, wherein the first image frame comprises a first object image and a second object image, and the second image frame comprises a third object image;
    a processor, calculating coordinate data of the first object image and the second object image of the first image frame separately, and calculating coordinate data of the third object image of the second image frame; and
    an outputting device, outputting a pointing coordinate data at the first time according to the coordinate data of the first object image of the first image frame, and outputting a pointing displacement between the first time and the second time according to the coordinate data of the second object image of the first image frame and the coordinate data of the third object image of the second image frame.

11. The pointing device apparatus of claim 10, wherein the second object image of the first image frame is the image closer to the third object image of the second image frame.

12. The pointing device apparatus of claim 10, wherein the second object image of the first image frame and the third object image of the second image frame are on the same trajectory.

13. The pointing device apparatus of claim 10, wherein the second object image of the first image frame is the image with a light intensity closer to that of the third object image of the second image frame.

14. The pointing device apparatus of claim 10, wherein the two images of the first image frame comprise an object image and a reflection image thereof.

15. The pointing device apparatus of claim 10, wherein the processor further combine the pointing coordinate data of the first time with the pointing displacement of the second time.

16. The pointing device apparatus of claim 10, wherein the images of the first image frame and the second image frame comprise identical shape or identical flickering frequency.

17. An image tracking method, comprising:
    providing an image sensor generating a first image frame and a second image frame, wherein the first image frame comprises two images related to a sensed target, and the second image frame comprises an image related to the sensed target; and
    providing a processor configured to output a coordinate data of one of the two images of the first image frame, and configured to output a relative displacement between the image of the second image frame and a corresponding image of the first image frame.

18. The image tracking method of claim 17, further comprising:
    tracking, by the processor, positions of the two images of the first image frame;
    outputting, by the processor, one of the positions of the two images of the first image frame as a first position parameter of the first image frame;
    determining, by the processor, one of the two images of the first image frame to be the corresponding image of the image of the second image frame; and
    calculating, by the processor, a relative displacement between the image of the second image frame and the corresponding image of the first image frame.

19. The image tracking method of claim 18, further comprising combining, by a processor, the first position parameter with the relative displacement to obtain a second position parameter.

20. The image tracking method of claim 18, wherein the determining step comprises comparing the relative displacements between the position of the image in the second image frame and the positions of the two images of the first image frame.

21. The image tracking method of claim 18, wherein the determining step comprises:
- determining a trajectory of the two images of the first image frame by a plurality of image frames prior to the first image frame; and
- comparing the position of the image of the second image frame to the trajectories.

22. The image tracking method of claim 18, wherein the determining step comprises comparing light intensity of the image of the second image frame to light intensities of the two images of the first image frame.

23. The image tracking method of claim 18, wherein the images of the first image frame and the image of the second image frame comprise same shape or same flickering frequency.

24. An electronic system, comprising:
- a sensed target;
- a pointing device apparatus, comprising:
  - an image sensor, sensing the target, and generating a first image frame and a second image frame, wherein the first image frame comprises two images related to the sensed target, and the second image frame comprises one image related to the sensed target;
  - a processor configured to output coordinate data of one of the two images of the first image frame and output a relative displacement between the image of the second image frame and a corresponding one of the two images of the first image frame; and
- an electronic apparatus comprising a monitor showing a cursor, wherein the electronic apparatus locates the cursor according to the coordinate data.

25. The electronic system of claim 24, wherein the processor is configured to:
- track positions of the two images of the first image frame;
- output a position of one of the two images of the first image frame as a first position parameter of the first image frame;
- determine one of the two images of the first image frame to be the corresponding image of the image of the second image frame; and
- calculate the relative displacement between the image of the second image frame and the corresponding image of the first image frame.

26. The electronic system of claim 24, wherein the processor is further configured to combine a first position parameter with the relative displacement to obtain a second position parameter.

27. The electronic system of claim 24, wherein the processor is configured to compare the relative displacements between the image of the second image frame and the two images of the first image frame respectively.

28. The electronic system of claim 24, wherein the processor is configured to:
- determine a trajectory of the two images of the first image frame according to a plurality of image frames prior to the first image frame; and
- compare a position of the image of the second image frame to the trajectory.

29. The electronic system of claim 24, wherein the processor compares light intensities between the image of the second image frame and the two images of the first image frame respectively.

30. The electronic system of claim 24, wherein the electronic apparatus locates the cursor according to the result of a summation of an image position of the second image frame and the relative displacement.

\* \* \* \* \*